United States Patent [19]
Pottier-Metz et al.

[11] Patent Number: 5,977,234
[45] Date of Patent: Nov. 2, 1999

[54] HIGH-DENSITY THERMOPLASTIC MOULDING COMPOSITION

[75] Inventors: Catherine Marie Pottier-Metz, Le Mont Saint Adrien, France; Hendrik Theodorus van de Grampel, Bergen op Zoom, Netherlands

[73] Assignee: General Electric Company, Pittsfield, Mass.

[21] Appl. No.: 08/763,598

[22] Filed: Dec. 11, 1996

[30] Foreign Application Priority Data

Dec. 13, 1995 [FR] France ................................ 95 14792

[51] Int. Cl.⁶ .............................. C08J 5/10; C08K 3/18; C08K 3/22
[52] U.S. Cl. .......................... 524/430; 524/423; 524/443
[58] Field of Search .................... 524/430, 423, 524/443

[56] References Cited

U.S. PATENT DOCUMENTS

| | | | |
|---|---|---|---|
| 5,064,899 | 11/1991 | Buysch et al. | 525/64 |
| 5,140,083 | 8/1992 | Kato et al. | 526/262 |
| 8,130,177 | 4/1964 | Grabowski | 260/45.5 |

FOREIGN PATENT DOCUMENTS

| | | |
|---|---|---|
| 0 248-308 | 5/1987 | European Pat. Off. . |
| 0 423-510 | 4/1991 | European Pat. Off. . |
| 0423510 | 4/1991 | European Pat. Off. . |
| 2 073-617 | 10/1971 | France . |
| 259-565 | 12/1972 | Germany . |

OTHER PUBLICATIONS

JP–A–49 066 746 (abstract).
JP–A–07 053–833 (abstract).

*Primary Examiner*—Susan W. Berman
*Assistant Examiner*—U. K. Rajguru

[57] ABSTRACT

The moulding composition according to the invention includes, in parts by weight:
  a) 0 to 60 parts of one or more ABS polymerizate resins,
  b) 100 to 40 parts of a polymer component chosen from styrene polymers, SAN copolymers and their mixtures, and, per 100 parts by weight of (a) and (b),
  c) 10 to 500 parts of an inorganic filler chosen from zinc oxide, barium sulphate, zirconium oxide, zirconium silicate and their mixtures; this composition being characterized in that the polymer component (b) includes
    i) 0 to 90% by weight of styrene polymers and/or SAN copolymers which have a limiting viscosity number higher than 0.60, and
    ii) 100 to 10% by weight of styrene polymers and/or SAN copolymers which have a limiting viscosity number lower than or equal to 0.60.

Application to the manufacture of moulded objects which have ceramic properties.

13 Claims, No Drawings ent invention relates, in a general manner, to
HIGH-DENSITY THERMOPLASTIC MOULDING COMPOSITION The present invention relates, in a general manner, to moulding compositions based on highly filled, dense, thermoplastic materials which have properties similar to ceramics, and in particular to such compositions consisting essentially of ABS polymerizate resins, styrene polymers and styrene/acrylonitrile (SAW) copolymers.

These very dense thermoplastic moulding compositions are employed in applications which are generally reserved for ceramics or for filled thermosetting compositions. These dense, thermoplastic moulding compositions are particularly advantageous because of their relative ease of manufacture.

Such dense, thermoplaatic moulding compositions comprising high quantities of inorganic filler and capable of being moulded into articles which have properties similar to ceramics are described in particular in patent EP 0 423 510.

However, when the main polymer components of these dense thermoplastic moulding compositions include chiefly ABS resins, styrene polymers, SAN copolymers or their mixtures, the objects moulded from these compositions exhibit surface imperfections making the moulded object unattractive.

More particularly, objects moulded from these compositions exhibit surface marbling, this defect becoming more pronounced with the increase in the proportion of filler in the composition. It is probable that this defect would be still more accentuated when the compositions employed comprise dyes and/or pigments to obtain coloured moulded objects.

The objective of the invention is therefore to provide dense thermoplastic moulding compositions including essentially as polymer components ABS polymerizate resins, styrene polymers, styrene/acrylonitrile copolymers and their mixtures, making it possible to obtain moulded objects which have an improved surface appearance and in particular not exhibiting any surface marbling.

According to the invention a thermoplastic moulding composition is produced including, in parts by weight:
 a) 0 to 60 parts of one or more ABS polymerizate resins,
 b) 100 to 40 parts of a polymer component chosen from styrene polymers, styrene/acrylonitrile (SAN) copolymers and their mixtures and, per 100 parts by weight of (a) and (b),
 c) 10 to 500 parts of an inorganic filler chosen from zinc oxide, barium sulphate, zirconium oxide, zirconium silicate and their mixtures;
 characterized in that the polymer component (b) includes:
  i) 0 to 90% by weight of styrene polymers and/or styrene/acrylonitrile copolymers which have a limiting viscosity number higher than 0.60, and
  ii) 100 to 10% by weight of styrene polymers and/or styrene/acrylonitrile copolymers which have a limiting viscosity number lower than or equal to 0.60.

In the case of the component a) of the compositions according to the invention it is possible to employ any ABS polymerizate resins and in particular ABS polymerizate resins obtained by emulsion or bulk polymerization.

The ABS polymerizates which can be used in the present invention are well known in the art and it is also possible to employ ABS polymerizates or mixtures of these ABS polymerizates with nitrile-butadiene, styrene-butadiene and styrene-butadiene-styrene elastomers.

Within the scope of the present invention the ABS polymerizates include acrylonitrile-butadiene-styrene (ABS) polymerizates, as well as acrylonitrile-styrene-butyl acrylate (ABA) polymerizates and acrylonitrile-EPDM-styrene (ABS) polymerizates.

The ABS polymerizates which can be used in the present invention and methods of their preparation are well known In the art and are described, inter alia, in EP-A-0 248 308, DE-A-2 259 565 and U.S. Pat. No. 3,130,177.

ABS polymerizates are polymerizates in which there are polymerized by grafting onto a rubber either a styrene and methyl methacrylate monomer or a monomer mixture of 95–50% by weight of styrene, $\alpha$-methylstyrene and methyl methacrylate or their mixtures and 5–50% by weight of acrylonitrile, methyl methacrylate, maleic anhydride, N-substituted maleimides or their mixtures. The rubbers which can be used are in particular polybutadiene, butadiene/styrene copolymerizates with up to 30% by weight of polymerized styrene, butadiene and acrylonitrile copolymerizates with 20% by weight of acrylonitrile or butadiene copolymerizates with up to 20% by weight of a lower alkyl enter of acrylic or methacrylic acid (for example methyl acrylate, ethyl acrylate, methyl methacrylate and ethyl methacrylate).

ABS graft polymerizates contain 5 to 80% by weight, better 20 to 70% by weight, of rubber and 95 to 20% by weight, better from 80 to 30% by weight, of grafted polymerized polymers.

Particularly recommended are the ABS polymerizates obtained by polymerization by grafting polybutadiene with styrene and acrylonitrile monomers.

More particularly, in these recommended ABS polymerizates the sum of the styrene plus acrylonitrile monomers introduced during the grafting of the polybutadiene is between 30 and 70% by weight with a styrene/acrylonitrile ratio which can vary from 9/1 to 3/2, combined with 70 to 30% by weight of polybutadiene.

When the ABS polymerizate resin is in powder form, it preferably contains 20 to 70% by weight of butadiene. When the ABS polymerizate resin is in granulate form it preferably contains 4 to 40%, better still 4 to 30% by weight, of butadiene.

The quantity of resin or of mixture of ABS polymerizate resins of the component (a) generally represents from 0 to 60 parts by weight, preferably 10 to 40 parts by weight, per 100 parts by weight of polymer components (a) and (b).

The polymer component (b) of the compositions according to the invention is chosen from styrene polymers, styrene/acrylonitrile (SAN) copolymers and their mixtures.

The styrene polymers which can be used in the present invention include homopolystyrenes such as homopolystyrene itself, homopoly(alkylstyrenes), such as poly($\alpha$-methyletyrene) and homopoly(halostyrenes) such as poly-$\alpha$-chlorostyrene and poly-a-bromostyrene.

The styrene polymers which can be used in the compositions of the invention further include styrene copolymers in which a proportion of the styrene units is replaced by other styrene-based monomer units such as $\alpha$-methylstyrene, halogenated styrenes or vinyltoluene.

The SAN copolymers of the present invention and processes for their preparation are well known in the art and are described, inter alia, in patent EP-A-0 248 308.

The SAN copolymers which can be used in the present invention are copolymerizates of 95 to 40 parts by weight of styrene, $\alpha$-methylstyrene, methyl methacrylate or their mixtures and of 5 to 60 parts by weight of acrylonitrile, methacrylonitrile, methyl methacrylate and their mixtures.

More particularly recommended are the styrene/acrylonitrile copolymers which have a ratio of the styrene units to the acrylonitrile units of 85/15 to 40/60 and preferably of 80/20 to 60/40 and a weight-average molecular mass, determined by gel permeation chromatography, of between 1000 and 200000, better still between 40000 and 170000.

The SAN copolymers which can be used in the present invention preferably contain 15 to 45% by weight, better still 25 to 35% by weight, of acrylonitrile units relative to the total weight of the copolymer.

As indicated above, the quantity of the polymer component (b) in the compositions of the invention represents 100 to 40 parts by weight, preferably 90 to 60 parts by weight, per 100 parts by weight of components (a) and (b). According to the invention this polymer component (b) consists either solely of styrene polymers and/or of SAN copolymers which have a limiting viscosity number lower than or equal to 0.60 or of a mixture of styrene polymers and/or SAN copolymers which have a limiting viscosity number lower than or equal to 0.60 with up to 90% by weight of styrene polymers and/or SAN copolymers which have a limiting viscosity number higher than 0.60.

The polymer component (b) preferably contains 50 to 100% by weight of styrene polymers and/or of SAN copolymers which have a limiting viscosity number lower than or equal to 0.60 and 0 to 50% by weight of styrene polymers and/or SAN copolymers which have a limiting viscosity number higher than 0.60.

Preferably too, the limiting viscosity number of the styrene polymers and/or SAN copolymers which have a limiting viscosity number lower than or equal to 0.60 is between 0.20 and 0.55, better still between 0.35 and 0.50.

As is well known, the limiting viscosity number (or intrinsic viscosity) is the limiting value of the viscosity number at infinite dilution. It is generally estimated by determining the viscosity number at several low concentrations and by extrapolating the values to c =0. The solvent employed in the present invention for determining the limiting viscosity number is dimethyl-foramide and the measurements are made at 30° ± 0.2° C. with an Ubbelohde viscometer model SO A.

The polymers and copolymers which are recommended for the polymer component (b) are homopolystyrenes and SAN copolymers. It is particularly recommended to employ SAN copolymers.

The compositions according to the invention also contain, per 100 parts by weight of polymer components (a) and (b), 10 to 500, preferably 50 to 300, parts by weight of an inorganic filler chosen from zinc oxide, barium sulphate, zirconium oxide, zirconium silicate and their mixtures.

The zinc oxide may be in the form of zincite or white zinc oxide produced synthetically by the indirect French process employing metallic zinc or zinc metal residues, or by the American process employing zinc residues, or by a wet-route chemical process. It is recommended to employ a finely divided form which has a mean particle diameter of between 0.05 and 50 μm, preferably 0.1 to 5 μm and better still of approximately 1.5 μm.

The barium sulphate may be in the form of naturally occurring barytes or in the form of barium sulphate obtained synthetically by employing well-known synthesis techniques. The particle size may vary from 0 to 50 μm, preferably from 1 to 15 μm and, better still, is approximately 8 μm.

The zirconium oxide occurs naturally in the form of baddeleyite or can be prepared by employing well-known procedures. Particles between 0.1 and 50 μm in size may be employed. The zirconium silicates may be employed in the form of zircon or in the form of materials obtained synthetically which have a particle size from 0.7 to 50 μm.

In most applications the zinc oxides, barium sulphate, zirconium oxide, zirconium silicates or their mixtures may be employed alone. All these materials or mixtures thereof may be employed in combination. In addition, instead of one of these materials or of a combination thereof, it is possible to employ up to 50% by weight of the total filler contents, and better still up to 15% by weight, of an inorganic filler such as alumina, amorphous silica, anydrous aluminium silicate, barium ferrite, calcium carbonate, mica, felspar, clays such an kaolin, talc, magnesium oxide, magnesium silicate, nepheline, eyenite, phenolic resins, glass microspheres, wollaston te, titanium dioxide, ground quartz and the like.

The recommended inorganic filler is barium sulphate.

The compositions according to the invention may also include other conventional adjuvants such as antioxidants, internal lubricants, dispersants and mould release agents, anti-UV agents, antistatic agents, dyes, pigments and flame retardants, coupling agents such as aminosilanes, impact strength modifiers and extending or reinforcing fillers such as glass fibres.

Among the antioxidants there may be mentioned phosphites, sterically hindered phenols, secondary amines and the like, which may be added in a quantity which is effective for retarding oxidative degradation.

Among the lubricants that may be employed in the compositions of the present invention there may be mentioned, by way of example, magnesium stearate, zinc stearate, polyethylene wax, paraffin wax, ethylene and propylene oxide wax, butyl stearate, glycerol monostearate, barium stearate, sodium stearate, stearyl alcohol and octyl behenate.

Pentaerythritol tetrastearate may be employed as dispersing agent. This compound also acts as an external lubricant or demoulding agent.

The compositions according to the invention may also comprise flame-retardant agents in an effective quantity, such as, for example, tetrabromo biaphenol, bistribromophenoxyethane, polybromodiphenyl ether, polybromophenol, polybromophenyl alkyl ethers, polybromobenzyl acrylate or polyacrylate, polybromocyclodecane, polybromostyrene, polybromophenylmaleimide, brominated epoxy monomers or epoxy polymers and copolycarbonates derived from a halodiphenol substituted with a diphenol, the halogen being preferably chlorine or bromine.

Also preferably, the halogenated organic flame retardant is employed in combination with a synergistic compound such as an antimony compound, for example antimony oxide.

The compositions of the present invention may also contain dyes and pigments such as, for example, titanium oxide, ultramarine blue, carbon black and the like.

The compositions according to the invention may further contain antistatic agents, for example solid antistatic agents such an those described in French Patent Application FR-95 12 298.

Some of the compositions according to the invention are extremely dens and will have a relative density higher than 2.0, depending on the proportion of filler which is incorporated.

The following examples, and the attached figures, serve to illustrate the recommended embodiments of the invention.

In the examples all the percentages and parts are expressed by weight unless indicated otherwise.

COMPARATIVE EXAMPLE A AND EXAMPLE 1 TO 4

The compositions shown in Table 1 below were prepared conventionally by mixing by means of a twin-screw machine.

TABLE 1

|  | Comparative A | Example No. 1 | 2 | 3 | 4 |
|---|---|---|---|---|---|
| Graft ABS polymerizate[1] | 30.2 | 30.2 | 30.2 | 30.2 | 30.2 |
| SAN 1 | — | 34.9 | 34.9 | — | — |
| SAN 2 | — | 34.9 | — | — | — |
| SAN 3 | — | — | 34.9 | 69.8 | — |
| SAN 4 | 69.8 | — | — | — | — |
| SAN 5 | — | — | — | — | 69.8 |
| BaSO$_4$ | 132.5 | 132.5 | 132.5 | 132.5 | 132.5 |
| Lubricant[2] | 4.2 | 4.2 | 4.2 | 4.2 | 4.2 |

[1]Grafted ABS polymerizate containing, by weight, 12% of acrylonitrile, 50% of butadiene and 38% of styrene.
[2]Lubricant which has the composition: 38.9% mixture of silicone fluids, 55.55% of ethylene-bisstearamide wax and 5.55% MgO.

The SAN copolymers given references SAN 1 to 5 which were employed had the following properties indicated in Table 2.

TABLE 2

|  | Styrene/AN ratio | Limiting viscosity number | Weight-average molecular mass $M_w \times 10^{-3}$ | Number-average molecular mass $M_n \times 10^{-3}$ |
|---|---|---|---|---|
| SAN 1 | 66/34 | 0.57 | 101 | 50 |
| SAN 2 | 75/25 | 0.48 | 90 | 47 |
| SAN 3 | 72/25 | 0.35 | 66.5 | 35 |
| SAN 4 | 72/28 | 0.66 | 140 | — |
| SAN 5 | 72/28 | 0.55 | 105 | — |

The compositions of Comparative Example A and of Examples 1 and 2 were moulded by using an Arburg injection press, with a 60 × 75 mm small plaque, at a melt temperature of 260° C. and a mould temperature of 90° C.

micrographs of a part of the surface of the small moulded plaques were produced by means of a scanning electron microscope, in backscattering mode, with various magnifications.

FIG. 1a and 1b are electron microscope micrographs of an object moulded from the comparative composition A at magnifications of 100 and 1010 respectively. FIGS. 2a and 2b are electron microscope micrographs, at magnifications of 103 and 1020 respectively, of a part of the surface of an object moulded from the composition of Example 1, and FIGS. 3a, 3b and 3c are electron microscope micrographs, at magnifications of 100, 1010 and 1020, of a part of the surface of an object moulded from the composition of Example 2.

A simple visual comparison of these electron microscope micrographs clearly shows that the objects moulded from the compositions of Examples 1 and 2 have a much more homogeneous surface appearance than the surface of the object moulded from the comparative composition A. Even though the object moulded from the composition of Example 1 has a few surface defects, these are clearly less numerous and the homogeneity of the structure is clearly improved in relation to the object moulded from the composition of Comparative Example A. The object moulded from the composition of Example 2 has a particularly good surface appearance with practically no defects, even at a magnification of 1020.

The melt index at 220° C. under a 2.16 kg load, the Izod infact strength on an unnotched test piece at ambient temperature and the density of the compositions of Comparative Example A and of Examples 2 to 4 were measured. The surface appearance of the small plaques obtained by moulding these compositions was also determined visually.

The results are given in Table 3 below.

TABLE 3

|  | Comparative A | Example No. 2 | 3 | 4 |
|---|---|---|---|---|
| Melt index 220° C./12.16 kg (g/10 min) | 9.2 | 24.4 | 58 | 18.3 |
| Izod impact strength unnotched test piece 1V. TA (kj/m$^2$) | 17.1 | 20.5 | 10.3 | 20.3 |
| Relative density | 1.82 | 1.86 | 1.84 | 1.83 |
| Surface appearance | 000 | ++ | +++ | 0 |

000 very bad
00 bad
0 average
+ good
++ very good
+++ excellent

The results in Table 3 show that the compositions according to the invention have a melt index which in clearly higher than the compositions of the comparative examples. The surface appearance of the small plaques moulded from the compositions according to the invention is incomparably superior to that of the small plaques of the comparative example. In addition, the other desirable properties are not appreciably deteriorated. Even though the Izod impact strength is decreased in the case of the composition of Example 3, this decrease remains tolerable in relation to the improvement obtained in the surface appearance.

EXAMPLES 5 TO 8

Mixtures which have the compositions shown in Table 4 below were produced by extrusion by means of a twin-screw machine. In these mixtures the SAN copolymers employed were the same as those employed in the preceding examples.

TABLE 4

|  | Example No. 5 | 6 | 7 | 8 |
|---|---|---|---|---|
| Graft ABS polymerizate[1] | 30 | 30 | 30 | 30 |
| SAN 1 | 50 | 35 | 50 | 35 |
| SAN 2 | 20 | 35 | — | — |
| SAN 3 | — | — | 20 | 35 |
| BaSO$_4$ | 127.5 | 127.5 | 127.5 | 127.5 |
| Lubricant [1] | 4.1 | 4.1 | 4.1 | 4.1 |

[1]Graft ABS polymerizate containing, by weight, 12% of acrylonitrile, 50% of butadiene and 38% of styrene.
[2]Lubricant which has the composition: 38.9% mixture of silicone fluids, 55.55% of ethylene-bisstearamide wax and 5.55% MgO.

The compositions of Examples 5 to 8 were moulded in the form of small discs with the aid of a Kraus Maffei 90 injection moulding press with 100-mm discs and the following moulding conditions:

stock temperature displayed 260° C.;
mould temperature displayed 80° C.

The melt index at 265° C. under a 2.16 kg load, the Izod impact strength on an unnotched test piece at ambient temperature, the flexural modulus and the density of the moulded products were measured. The surface appearance of the moulded discs was also determined visually. The results are shown in Table 5 below.

TABLE 5

|  | Example No. | | | |
| --- | --- | --- | --- | --- |
|  | 5 | 6 | 7 | 8 |
| Melt index 265° C./2.16 kg (g/10 min) | 17.3 | 21 | 23.9 | 35 |
| Izod impact strength unnotched test piece IV. TA (kJ/m²) | 17.3 | 18.2 | 18.5 | 14.1 |
| Flexural modulus (GPa) | 3.26 | 3.42 | 3.50 | 3.47 |
| Relative density | — | 1.76 | — | 1.77 |
| Surface appearance | 0 | + | + | ++ |

0 average
+ good
++ very good

The results in Table 5 show that the compositions according to the invention have a melt index which is clearly higher than the comparative composition A and a surface appearance which is clearly improved in relation to the objects moulded from the comparative composition A. Furthermore, it is also noted that the other desirable properties of the compositions according to the invention have not deteriorated.

In the above examples all the quantities of the components are expressed in parts by weight. In the case of the components other than the polymer components the quantities are referred to 100 parts by weight of polymer components.

Furthermore, in the preceding examples the barium sulphate employed was a commercial barium sulphate sold under the name "Portaryte B15" by Ankerpoort BV and which had the following characteristics:

| chemical analysis | BaSO$_4$ 97% (XRF) |
| --- | --- |
| particle size analysis | <15 μm 97% (laser scattering) |
| density | 4.4 g/cm³. |

Finally, the weight- and number-average molecular masses of the styrene/acrylonitrile copolymers of the above examples were determined by gel permeation chromatography.

The present invention therefore provides dense, thermoplastic moulding compositions making it possible to obtain moulded objects which have an improved surface appearance while retaining the other desirable properties such as the Izod impact strength and the flexural modulus.

We claim:

1. Thermoplastic moulding composition including, in parts by weight:
   a) 10 to 40 parts of one or more acrylonitrile-butadiene styrene (ABS) polymerizate resins,
   b) 100 to 40 parts of a polymer component chosen from styrene polymers, styrene/acrylonitrile (SAN) copolymers and their mixtures, and, per 100 parts by weight of (a) and (b),
   c) 10 to 500 parts of an inorganic filler chosen from zinc oxide, barium sulphate, zirconium oxide, zirconium silicate and their mixtures,
   characterized in that the polymer component (b) includes:
      i) 0 to 90% by weight of styrene polymers and/or styrene/acrylonitrile copolymers which have a limiting viscosity number higher than 0.60, and
      ii) 100 to 10% by weight of styrene polymers and/or styrene/acrylonitrile copolymers which have a limiting viscosity number lower than or equal to 0.60.

2. The composition according to claim 1, characterized in that the component b(i) represents 0 to 50% by weight and the component b(ii) 50 to 100% by weight of the component (b).

3. The composition according to claim 1 characterized in that the component b(ii) has a limiting viscosity number of between 0.20 and 0.55.

4. The composition of claim 3 characterized in that the component b(ii) has a limiting viscosity number between 0.35 and 0.50.

5. The composition of claim 1, characterized in that the quantity of inorganic filler (c) in between 40 and 300 parts by weight per 100 parts of (a) and (b).

6. The composition of claim 5, characterized in that the styrene polymers of the component (b) are chosen from homopolystyrene, homopoly(alkylstyrenes), homopoly (halostyrenes) and styrene copolymers in which a proportion of the styrene monomer units is replaced by other styrene-based monomer units.

7. The composition of claim 6, characterized in that the component (a) is chosen from ABS polymerizate resins obtained by bulk polymerization or emulsion polymerization.

8. Composition according to claim 7, characterized in that the component (a) is a graft ABS polymerizate resin.

9. Composition according to claim 8, characterized in that the graft ABS polymerizate resin is a graft acrylonitrile-butadiene-styrene polymerizate resin, a graft butylacrylate-styrene-acrylonitrile polymerizate resin, a graft acrylonitrile-EPDM-styrene polymerizate resin or a mixture of these resins.

10. The composition according to claim 8, characterized in that the ABS polymerizate resin is an acrylonitrile-butadiene-styrene polymerizate resin containing from 20 to 70% by weight of butadiene relative to the total weight of ABS polymerizate resin.

11. The composition according to claim 1, characterized in that it additionally includes one or more ingredients chosen from antioxidants, internal or external lubricants, flame retardants, dyes and pigments, anti-UV agents, antistatic agents, coupling agents, impact strength modifiers and reinforcing and extending fillers.

12. The composition according to claim 1, characterized in that the component (c) is barium sulphate.

13. The composition according to claim 5, characterized in that the polymer component (b) consists solely of SAN copolymers and the filler is barium sulphate.

* * * * *